3,411,900
BRAZING ALLOY COMPOSITION

Edward R. Roeder and Ernst G. Huschke, Jr., Canoga Park, Calif., assignors to North American Rockwell Corporation, a corporation of Delaware
No Drawing. Filed Apr. 13, 1966, Ser. No. 542,192
2 Claims. (Cl. 75—173)

This invention relates to a new brazing alloy. More particularly, this invention relates to a new silver base brazing alloy containing palladium, copper, and nickel. The invention was made in the performance of work under a NASA contract and is subject to the provisions of the National Aeronautics and Space Act of 1958, Public Law 85–568 (72 Stat. 426; 42 USC 2451) as amended.

In the furnace brazing of regeneratively cooled tubular wall rocket engine thrust chambers, there is normally required the utilization of a two-step furnace brazing operation. This has been necessary because the brazing alloy retention presents a problem in various areas on the thrust chamber depending upon the position in the furnace. The process developed for many of the thrust chambers includes a first brazing step with the unit having the bell-shaped end downward with the second step at a lower temperature with the unit exhaust nozzle upward. The brazing alloy compositions previously used were selected after extensive screening of those available. For the first-step braze, a high melting temperature, silver-base brazing alloy is selected. For the second step braze, a lower melting gold-base composition was previously used. The second step alloy which is comprised of gold, having 18 percent nickel therein, had good brazing characteristics, good metallurgical behavior with the base metals and first-step brazing alloy composition, and brazed at a temperature which allows heat treatment of the base metals. However, this alloy for the second-step braze has three major drawbacks. The gold alloy is quite expensive, has a high density, and has inconsistent gap filling capability. In view of this, it was desired to develop an alloy to overcome the deficiencies. It has brazing characteristics equivalent to the gold and nickel composition.

Thus it is an object of this invention to provide a new brazing alloy having good wetting capability of the base metal surfaces.

Another object of this invention is to provide a new brazing alloy having no intergranular penetration or erosion of base metals.

A further object of this invention is to provide a new brazing alloy having no stress cracking tendencies.

One further object of this invention is to provide a new brazing alloy which produces joints having good resistance to crevice corrosion.

Still a further object of this invention is to provide a new brazing alloy having excellent thermal conductivity.

The above and other objects of this invention are accomplished by a new brazing alloy from 80 to 95 weight percent silver, from 1 to 10 weight percent palladium, from 1 to 7.5 weight percent copper, and from .5 to 3.5 weight percent nickel with trace amounts of impurities having up to .05 weight percent aluminum, up to .05 weight percent boron, up to .015 weight percent sulfur, with a maximum of total impurities of .15 weight percent. A more preferred composition would have from 89.5 to 90.5 weight percent silver, 4.5 to 5.25 weight percent palladium, 3.95 to 4.5 weight percent copper, .90 to 1.25 weight percent nickel, with the same amount of impurities as previously indicated.

It is believed the invention will be better understood in further detail from the following description and detailed examples:

The new alloy is relatively safe compared to the prior ones, in that it does not erode or intergranularly penetrate the base metal materials when the recommended brazing temperatures from 1800 to 1830° F. are exceeded. As indicated, no erosion occurs even where specimens have been brazed as high as 2050° F. At this high temperature, the previously used gold-nickel alloy became very erosive. Flow of the new alloy on nickel plated surfaces and high nickel alloys is comparable to the previous gold-nickel alloy. However, the newer alloy exhibits formation of slightly larger fillets. This characteristic is considered desirable for second-step brazing applications where voids in unbrazed areas must be filled in by an alloy having such good filleting characteristics. Other advantages of the alloy of the invention over the previously utilized gold-nickel alloy will be shown in the detailed examples.

The alloy of the invention is prepared by commercial melting practices. Both wire and powder or prepared heats were used for extensive evaluation of the new material. All of the tests set forth below were performed on an alloy of this invention having 90 weight percent silver, 5 weigth percent palladium, 4 weight percent copper, and 1 weight percent nickel.

Example I

A small casting of the new alloy together with other comparison alloys were tested for thermal conductivity measurements in the −300° F. to 800° F. temperature range. The other alloys were of 90 weight percent silver—10 weight percent palladium, 82 weight percent gold—18 weight percent nickel, and 75 weight percent silver—20 weight percent palladium—5 weight percent manganese. The new alloy exhibited a higher thermal conductivity than any of the other brazing alloys. The gold with 18 weight percent nickel alloy exhibited the lowest of all conductivities. For example, at −200° F. the gold-nickel alloy had a thermal conductivity of about 8 B.t.u.-hr. ft. sq. (F/ft.). The allow of the invention had a thermal conductivity of about 65 B.t.u.-hr. ft. sq. (F/ft.). At 600° F. the gold-nickel alloy had a thermal conductivity of about 25 B.t.u.-hr. ft. sq. (F/ft.) while the alloy of the invention had a thermal conductivity of about 125 B.t.u.-hr. ft. sq. (F/ft.). The good thermal conductivity of the alloy of this invention indicates applicability for use for regeneratively cooled thrust chambers, heat exchangers, or other uses where high thermal conductance is desired.

The brazing alloy flow was evaluated concurrently with the corrosion studies of the new material. The corrosion-flow specimens were 1/16 x 1 x 3" plates with brazing alloy flow down by furnace heating under argon and hydrogen atmosphere. Additions of a commercially prepared flux, lithium fluoride and cryolite, which is sodium-aluminum fluoride, were used as wetting aids for studying the wetting and flow of the alloy of the invention on various base metal materials. It is to be pointed out that it is often desirable to use a wetting aid or flux with the brazing alloy. Excellent flow was indicated on nickel plated surfaces both with and without the aid of flux in both hydrogen and argon. On stainless steels, good to excellent flow was indicated in hydrogen atmospheres with the aid of flux. Flow in argon was more sluggish. The commercial flux used and cryolite were effective on stainless steels in argon atmospheres as well as hydrogen. Adequate flow was accomplished at 1800–1825° F. which is considered to be the optimum brazing range for the use of the new alloy. For brazing in this range, a small amount of suitable flux was found necessary as a brazing aid particularly for base metal materials containing relatively stable oxide formers such as aluminum, columbium, titanium, and in some instances chromium, since even relatively dry atmospheres were not fully effective in breaking down such stable oxides at these lower brazing temperatures. The general characteristic of the new alloy indicated a more sluggish flow and a tendency to form larger fillets than experienced with the previously used gold-nickel alloy, particularly when used on stainless steels. This characteristic is desirable as indicated previously when using it as a second-step braze alloy to fill-in voids and the like.

Example II

Corrosion tests were run on 316, 347, and 410 stainless steels, Inconel 600, Inconel X–750, and nickel-plated Inconel 718. Results of the corrosion tests as seen in Table I indicate no interfacial separation of the new brazing alloy from the base metals upon bending at 180° over ¼″ radius mandrel after both 50 and 100 hour exposures to 5 percent salt spray.

As can be seen, the tensile data obtained were compared to control specimens in which no filler metal was applied.

Example IV

A metallurgical examination was performed on brazed joints of stainless steel, nickel plated Inconel X–750, joined with either the new alloy of the invention or the previously described gold-nickel alloy. A primary analysis was made to determine alloying or other reaction of the brazing alloys with the base metals. Sections of joints processed through a simulated production cycle were mounted, polished and examined at various magnifications, both as polished and after etching to show base metal and TABLE I.—RESULTS OF 5 PERCENT SALT SPRAY CORROSION TESTS FOR INTERFACIAL SEPARATION OF TWO BRAZING ALLOYS FROM VARIOUS BASE METALS

| Braze Alloy | 347 SS 50–100 Hrs. | 410 SS [1] 50–100 Hrs. | Inconel 600 50–100 Hrs. | Ni Plated Inconel 718 [2] 50–100 Hrs. | Inconel X–750 [2] 50–100 Hrs. | 316 SS 50–100 Hrs. | Aged Inconel 718 [2] 50–100 Hrs. | Ni Plated 347 SS 50–100 Hrs. |
|---|---|---|---|---|---|---|---|---|
| 90Ag-5Pd-4Cu-1Ni | NS-NS | NS-NS | NS-NS | NS-NS | NS-NS | NS-NS | | |
| 82Au-18Ni | NS-S | NS-S | NS-NS | | NS-NS | NS-NS | NS-NS | NS-NS |

[1] Martensitic condition. [2] 2 hour age at 1,300° F. after brazing.
Legend: S—Separated upon bending 180° over ¼″ radius mandrel after corrosive exposure. NS—Not separated upon bending 180° over ¼″ radius mandrel after corrosive exposure.

Example III

Tests were performed to determine the stress cracking of the brazing alloy of the invention. Specimens used were .063 x .375 x 3.0″ sheared pieces of base metal sheet stock. The test specimen was placed longway between the jaws of a vise and given enough set to assure an upward bend. Flux was then applied to the top surface of the specimen and then was heated by torch to brazing temperature. Heating was continued and brazing filler metal was flowed onto the specimen. At the instant of wetting by the filler metal, closing of the vise was initiated. The filler metal was maintained molten until the initiation of a base metal crack was observed or a full 180° bend was achieved. Filler metal-base metal combinations that gave no visual indications of cracking were then subjected to an elevated temperature tensile test to provide more quantitative information. The gold–18 nickel alloy indicated a strong propensity to stress-crack Inconel 718 and was eliminated from additional stress cracking tests on the base metal material. Standard sheet tensile coupons were tested with the brazing alloy of the invention flowed over the gage lengths. The coupons were then heated and stabilized at test temperatures prior to loading in tension. Specimens were pulled in tension to destruction. Table II presents the results of the elevated temperature tensile tests for stress cracking.

(or) brazing alloy structures. The brazing alloy of the invention showed no aggression or erosion attack of either the stainless steel or nickel plated Inconel X–750 whereas the gold-nickel alloy attacked both base metals to a degree. In all cases the gold-nickel alloy dissolved the .001″ thick nickel plating used on the Inconel X–750.

Although the invention has been described and illustrated in detail, it is to be clearly understood that the same is by way of illustration and example only and is not to be taken by way of limitation, the spirit and scope of this invention being limited only by the terms of the appended claims.

We claim:
1. A brazing alloy consisting essentially of:
from 1 to 10 weight percent palladium,
from 1 to 7.5 weight percent copper,
from .5 to 3.5 weight percent nickel,
0 to .15 weight percent impurities, and
the balance silver, said silver being present in an amount of 80 to 95 weight percent.
2. A brazing alloy consisting essentially of:
from 4.5 to 5.25 weight percent palladium,
from 3.95 to 4.5 weight percent copper,
from .90 to 1.25 weight percent nickel,
from 0 to .15 weight percent impurities, and

TABLE II.—ELEVATED TEMPERATURE TENSILE TESTS FOR STRESS CRACKING EVALUATION

| Braze Alloy | Testing Temp., °F. | Percent Elongation in 2 inches (average of 3 tests) | | | | |
|---|---|---|---|---|---|---|
| | | 316 SS | 347 SS | Inconel 600 | Inconel 718 (Aged) [1] | Inconel X–750 (Aged) [1] |
| None (Control) | 1,600 | | 64 | 94 | 38 | 20 |
| | 1,700 | | 71 | | | |
| | 1,730 | | | | | 42 |
| | 1,800 | | 79 | 95 | 107 | 86 |
| 90Ag-5Pd-4Cu-1Ni | 1,680 | 56 | 68 | 77 | 89 | |
| | 1,730 | | | | | 40 |
| | 1,780 | 69 | 77 | 83 | 99 | 98 |
| | 1,880 | 65 | 73 | 85 | 82 | 97 |
| 82Au-18Ni | 1,690 | | 56 | 91 | (²) | 59 |
| | 1,790 | | 88 | 80 | (²) | 61 |
| | 1,890 | | 54 | 81 | (²) | 58 |

[1] Two hour age at 1,300° F. after brazing.
[2] Free bend screening tests indicated cracking.

the balance silver, said silver being present in an amount of 89.5 to 90.5 weight percent.

References Cited

UNITED STATES PATENTS

| | | | |
|---|---|---|---|
| 2,138,599 | 11/1938 | Gwyn | 75—173 X |
| 2,151,905 | 3/1939 | Emmert | 75—173 X |
| 2,300,286 | 10/1942 | Gwyn | 75—173 X |
| 2,805,155 | 9/1957 | Gelb et al. | 75—173 |
| 3,141,761 | 7/1964 | Rohm | 75—173 X |
| 3,163,500 | 12/1964 | Konrad et al. | 75—173 X |

FOREIGN PATENTS 573,176  11/1945  Great Britain.

CHARLES N. LOVELL, *Primary Examiner.*